United States Patent [19]
Kobayashi

[11] Patent Number: 5,790,765
[45] Date of Patent: Aug. 4, 1998

[54] COLOR PRINTER AND COLORS PRINTING METHOD FOR PRINTING MONOCHROME IMAGE OF DIFFERENT COLOR ONE ON ANOTHER

[75] Inventor: Masaki Kobayashi, Higashiyamato, Japan

[73] Assignee: Casio Computer Co., Ltd., Tokyo, Japan

[21] Appl. No.: 823,171

[22] Filed: Mar. 25, 1997

[30] Foreign Application Priority Data

Mar. 29, 1996 [JP] Japan ................... 8-077458

[51] Int. Cl.$^6$ ............................ G06F 15/00; B41J 2/315; B41J 2/47
[52] U.S. Cl. ...................... 395/109; 347/171; 347/247
[58] Field of Search .......................... 347/115, 237, 347/247, 41, 43, 900; 358/298, 450, 453, 515, 518, 530, 401, 501, 523; 395/109, 114, 115

[56] References Cited

U.S. PATENT DOCUMENTS

| | | | |
|---|---|---|---|
| 4,718,040 | 1/1988 | Naoki et al. | 395/109 |
| 4,926,254 | 5/1990 | Kimihiro et al. | 358/527 |
| 5,003,326 | 3/1991 | Akio et al. | 347/115 |
| 5,539,863 | 7/1996 | Hiroyuki et al. | 395/102 |

*Primary Examiner*—N. Le
*Assistant Examiner*—L. Anderson
*Attorney, Agent, or Firm*—Frishauf, Holtz, Goodman, Langer & Chick

[57] ABSTRACT

A received data analyzer 11 receives print data including rule data and paint data from a personal computer, and supplies the rule data to a rule width table generator 12 and the paint data to a compensation determining section 13. With regard to the rule data supplied from the received data analyzer 11, the rule width table generator 12 generates a rule width table indicating the coordinates of both ends of each rule and the width thereof and sends the table to the compensation determining section 13. When a paint area indicated by the paint data overlaps a rule indicated by the rule width table, the compensation determining section 13 compensates the coordinates of the left end, right end, upper end and lower end of the paint area included in the paint data. The compensation determining section 13 compensates the paint data in this manner in such a way as to avoid overlapping of the paint area and the rule, and then supplies the paint data to a printing section 14.

16 Claims, 13 Drawing Sheets

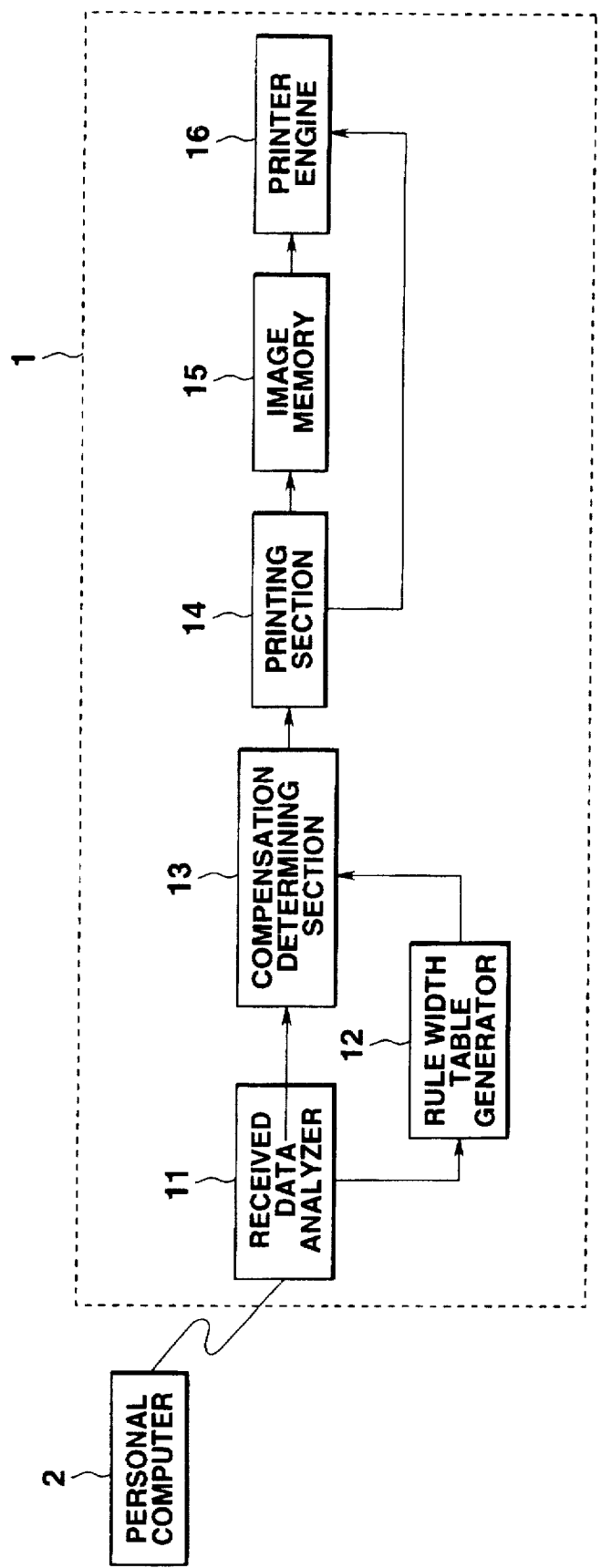

FIG.2B

| X COORDINATE VALUE OF START POINT | Y COORDINATE VALUE OF START POINT | X COORDINATE VALUE OF END POINT | Y COORDINATE VALUE OF END POINT | LINE WIDTH IN POSITIVE DIRECTION | LINE WIDTH IN NEGATIVE DIRECTION |
|---|---|---|---|---|---|
| (a) 100 | 50 | 500 | 50 | 3 | -2 |
| (b) 100 | 200 | 500 | 200 | 2 | -1 |
| (c) 100 | 350 | 500 | 350 | 3 | -2 |
| (d) 100 | 50 | 100 | 350 | 2 | -3 |
| (e) 300 | 50 | 300 | 350 | 1 | -2 |
| (f) 400 | 50 | 400 | 350 | 1 | -2 |
| (g) 500 | 50 | 500 | 350 | 2 | -3 |

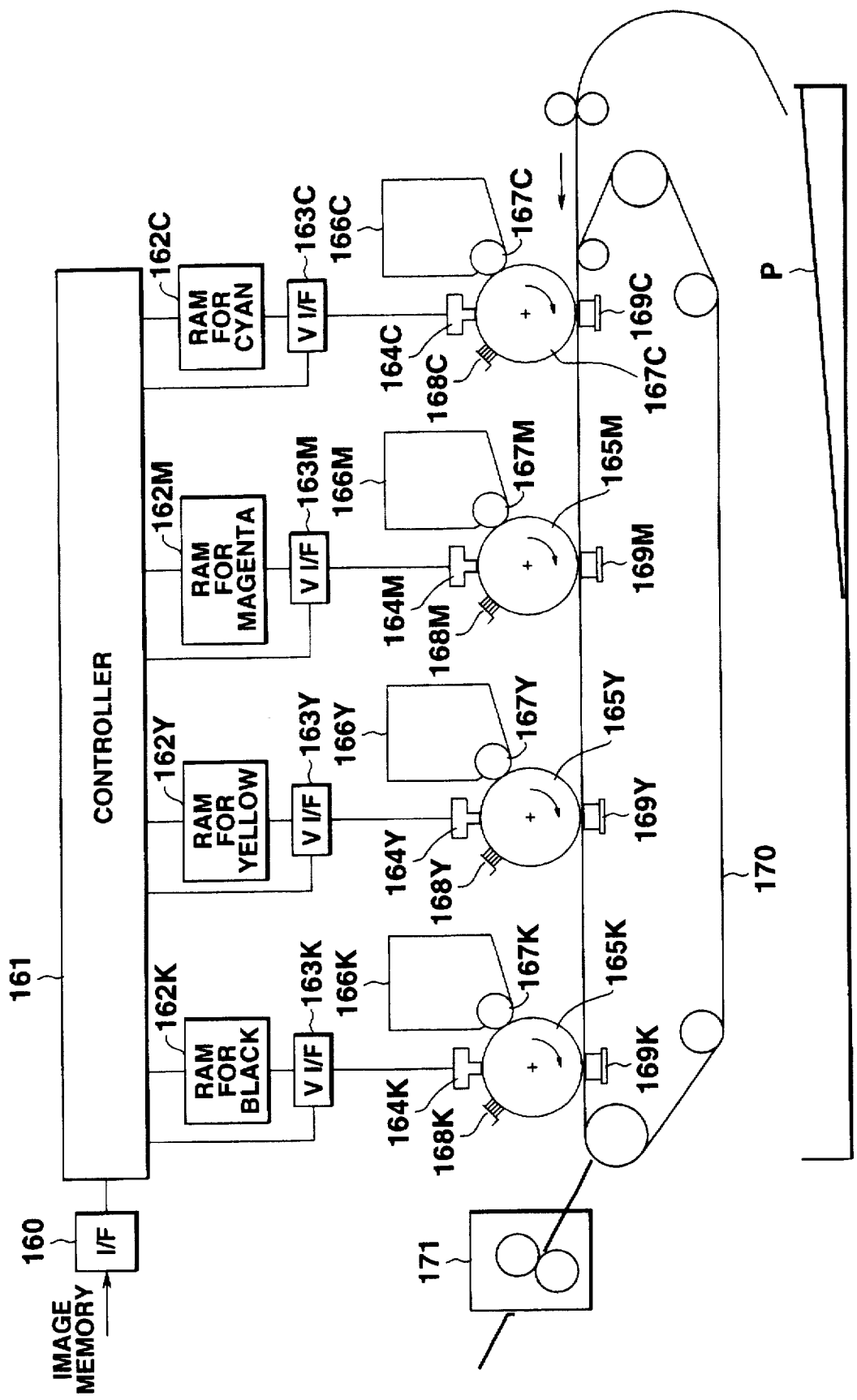

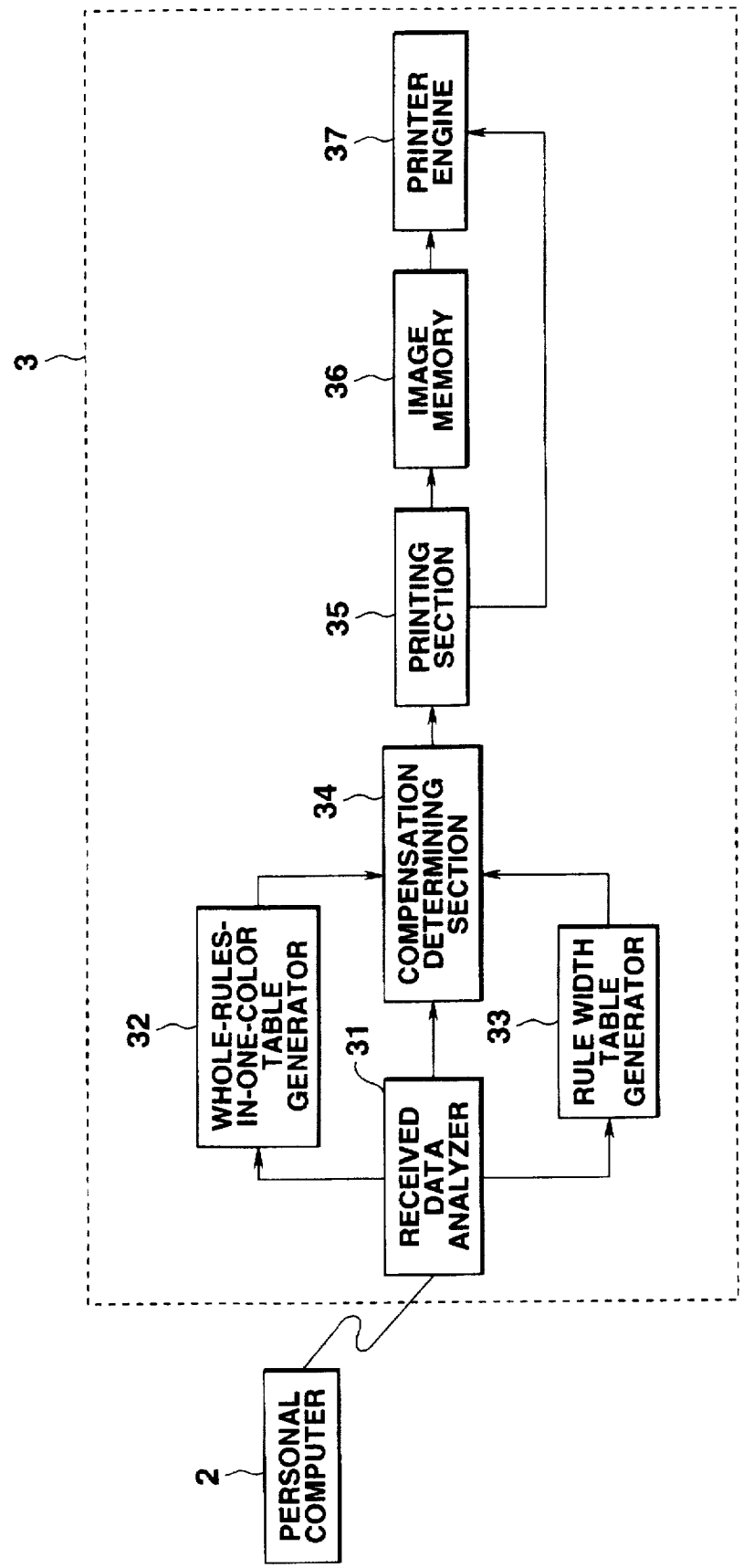

FIG.7

| FLAG | ON |
|---|---|
| COLOR OF WHOLE RULES | LIGHT BLUE |

FIG.8

| | X COORDINATE VALUE OF START POINT | Y COORDINATE VALUE OF START POINT | X COORDINATE VALUE OF END POINT | Y COORDINATE VALUE OF END POINT | LINE WIDTH IN POSITIVE DIRECTION | LINE WIDTH IN NEGATIVE DIRECTION | RULE COLOR |
|---|---|---|---|---|---|---|---|
| (a) | 100 | 50 | 500 | 50 | 3 | -2 | BLACK |
| (b) | 100 | 200 | 500 | 250 | 2 | -1 | LIGHT BLUE |
| (c) | 100 | 350 | 500 | 350 | 3 | -2 | BLACK |
| (d) | 100 | 50 | 100 | 350 | 2 | -3 | BLACK |
| (e) | 300 | 50 | 300 | 350 | 1 | -2 | GREEN |
| (f) | 400 | 50 | 400 | 350 | 1 | -2 | GREEN |
| (g) | 500 | 50 | 500 | 350 | 2 | -3 | BLACK |

COLOR PRINTER AND COLORS PRINTING METHOD FOR PRINTING MONOCHROME IMAGE OF DIFFERENT COLOR ONE ON ANOTHER

BACKGROUND OF THE INVENTION

1. Field Of The Invention

The present invention relates to a color printer and a printing method, and, more particularly, to a color printer and a printing method for printing a color image on a recording medium by printing monochrome images of different colors on the same recording medium one on another.

2. Description Of The Related Art

To help viewers understand information to be put on a spreadsheet more easily, conventionally, areas along frames (rules) of the spreadsheet (the areas will hereinafter called paint areas) are painted in desired colors. When the image of this spreadsheet is to be printed on recording paper, data indicative of rules (hereinafter called rule data) and data indicative of a paint area (hereinafter called paint data) are separately sent to a color printer from a computer which has formed the spreadsheet. Rule data is expressed by the coordinates of two points at both ends of each rule and the width of that rule. Paint data is expressed by the coordinates of the left end, right end, upper end and lower end of each paint area. The coordinates of both end points of a rule are normally used for the coordinates of the left end, right end, upper end and lower end of a paint area.

When receiving those data, the color printer separates an image corresponding to each data into four monochrome images of yellow, magenta, cyan and black and prints those monochrome images on recording paper one on another to acquire a color image.

With reference to FIGS. 12A to 12C, the printing process of a conventional color printer will be described below. In the example in FIG. 12A, rule data indicates a total of four rules, namely, a rule connecting two points of coordinates (2, 4) and (15, 4) and having a width of three dots, a rule connecting two points of coordinates (2, 4) and (2, 12) and having a width of three dots, a rule connecting two points of coordinates (2, 12) and (15, 12) and having a width of three dots, and a rule connecting two points of coordinates (15, 4) and (15, 12) and having a width of three dots. Those four rules form a closed rectangular area. If this rectangle is a paint area, paint data consists of the coordinate (x coordinate) of "2" of the left end, the coordinate (x coordinate) of "15" of the right end, the coordinate (y coordinate) of "4" of the upper end and the coordinate (y coordinate) of "13" of the lower end, as shown in FIG. 12B.

When the image of the rules shown in FIG. 12A and an image to be painted in the paint area shown in FIG. 12B are synthesized, an area where both images overlap each other is formed as shown in FIG. 12C. If the color of the image of the rules is magenta and the color of the image to be painted is yellow, the color of the area where both images overlap each other becomes red. As a result, the rules will not be printed in the designated color, thus degrading the quality of the printed color image.

SUMMARY OF THE INVENTION

Accordingly, it is an object of the present invention to provide a color printer and a printing method which can improve the quality of a color image obtained by printing monochrome images of different colors one on another.

To achieve this object, a color printer according to the first aspect of this invention comprises:

first image data reception means for receiving first image data including externally supplied data indicative of a first area for printing a first image on a recording medium;

second image data reception means for receiving second image data including externally supplied data indicative of a second area for printing a second image on the recording medium;

overlapping-area discriminating means for discriminating an overlapping area where the first and second areas indicated by the data included in the first and second image data respectively received by the first and second image data reception means overlap;

area compensation means for compensating the second area in accordance with a result of discrimination in the overlapping-area discriminating means; and printing means for printing the first image in the first area indicated by the data included in the first image data and the second image in the second area compensated by the area compensation means, respectively.

In this color printer, the first and second image data may further include data respectively indicating colors of the first and second images;

image color determining means for determining if the colors of the first and second images indicated by the first and second image data are identical may further be provided; and the area compensation means may have means for not compensating the second area when the image color determining means has determined that the colors of the first and second images are identical.

To achieve the above object, a printing method according to the second aspect of this invention comprises:

an overlapping-area discriminating step of discriminating an overlapping area where a first area for printing a first image on a recording medium and a second area for printing a second image on the recording medium overlap each other;

an area compensation step of compensating the second area in accordance with a result of discrimination in the overlapping-area discriminating step;

a first image printing step of printing the first image in the first area; and a second image printing step of printing the second image in the second area compensated by the area compensation step.

To achieve the above object, a program storage medium according to the third aspect of this invention stores a program for accomplishing:

an overlapping-area discriminating function for discriminating an overlapping area where a first area for printing a first image on a recording medium and a second area for printing a second image on the recording medium overlap each other;

an area compensation function for compensating the second area in accordance with a result of discrimination made by using the overlapping-area discriminating function;

a first image printing function for printing the first image in the first area; and a second image printing function for printing the second image in the second area compensated by using the area compensation function.

BRIEF DESCRIPTION OF THE DRAWINGS

FIG. 1 is a block diagram showing the functions of a color printer according to the first embodiment of this invention;

FIG. 2B is a diagram showing an example of a rule width table which is generated by a rule width table generator of the color printer in FIG. 1;

FIG. 3 is a schematic cross-sectional view showing the structure of an printer engine of the color printer in FIG. 1;

FIG. 6 is a block diagram depicting the functions of a color printer according to the second embodiment of this invention;

FIG. 7 is a diagram showing an example of a whole-rules-in-one-color table which is generated by a whole-rules-in-one-color table generator of the color printer in FIG. 6;

FIG. 8 is a diagram showing an example of a rule width table which is generated by a rule width table generator of the color printer in FIG. 6;

DETAILED DESCRIPTION OF THE PREFERRED EMBODIMENTS

Figure 2A:
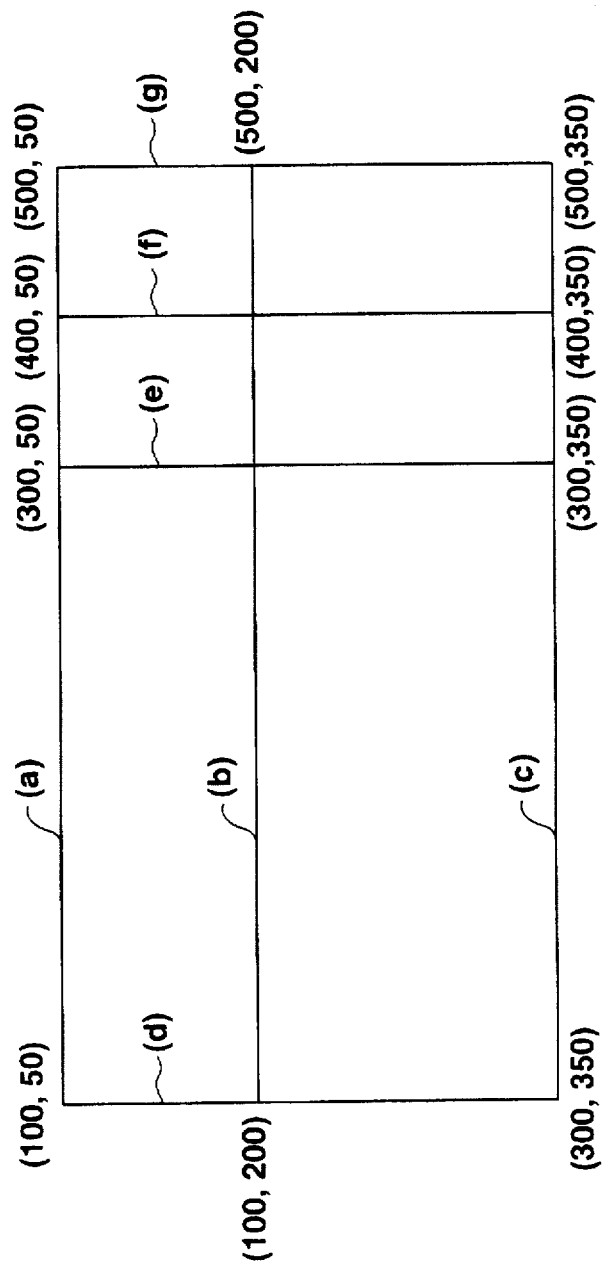
FIG. 2A is a diagram exemplifying rules which are to be printed by the color printer according to the first embodiment.

Preferred embodiments of the present invention will now be described with reference to the accompanying drawings.

First Embodiment

FIG. 1 presents a block diagram showing the functions of a color printer according to the first embodiment of this invention. As illustrated, this color printer 1 comprises a received data analyzer 11, a rule width table generator 12, a compensation determining section 13, a printing section 14, an image memory 15 and a printer engine 16. The color printer 1 has a CPU (Central Processing Unit) and RAM (Random Access Memory) and accomplishes the functions of all the other sections 11 to 15 than the printer engine 16 by a predetermined printer program.

The color printer 1 is connected to a personal computer 2, which generates print data of an image to be printed by the color printer 1, in accordance with a spreadsheet application program. The print data which is generated by the personal computer 2 includes rule data, paint data, text data and a form feed code. The rule data and paint data are the same as have been discussed in the foregoing description of the related art. The text data indicates the codes of characters and symbols which are to be put in an area surrounded by rules of a spreadsheet, and includes control codes like return code. The form feed code is one control code which indicates that a page to print an image on changes. The rule data, paint data and text data include data indicative of colors in which images corresponding to those data are printed. The personal computer 2 sends out print data to the printer 1 in accordance with a command entered through an input device by an operator. The print data is output from the personal computer 2 in the order of the rule data, paint data, text data and form feed code.

The received data analyzer 11 receives the print data from the personal computer 2. The received data analyzer 11 extracts rule data from the received print data and sends it to the rule width table generator 12. The received data analyzer 11 sends the other data than the rule data to the compensation determining section 13.

The rule width table generator 12 generates a rule width table based on the rule data supplied from the received data analyzer 11. The rule data of each rule is given by the coordinates of both ends of that rule and the width thereof. To print seven rules (a) to (g) in FIG. 2A, for example, the rule width table shown in FIG. 2B is generated. In this rule width table, the x coordinate of the start point of the rule, the y coordinate of the start point of the rule, the x coordinate of the end point of the rule, the y coordinate of the end point of the rule, the line width in the positive direction and the line width in the negative direction are storaged. The line width in the positive direction and the line width in the negative direction are given by the numbers of dots from the reference line which connects the coordinates of the start point and the coordinates of the end point. For a rule parallel to the X axis, for example, the line width in the positive direction becomes the number of dots in the positive direction along the Y axis and the line width in the negative direction becomes the number of dots in the negative direction along the Y axis. The rule width table generator 12 supplies the generated rule width table to the compensation determining section 13.

The compensation determining section 13 extracts rule data from the rule width table supplied from the rule width table generator 12 and supplies it to the printing section 14. The compensation determining section 13 compensates the paint data supplied from the received data analyzer 11 by referring to the rule width table. Specifically, the compensation determining section 13 determines if the paint area lies within the width of the rule, and compensates the coordinates of the paint data in such a way that the coordinates of the paint data lie outside the width of the rule, when the paint area lies within the width of the rule. The compensation determining section 13 supplies the compensated paint data to the printing section 14. The compensation determining section 13 also supplies the text data and form feed code, supplied from the received data analyzer 11, to the printing section 14.

The printing section 14 separates each of images corresponding to the supplied rule data, paint data and text data into monochrome images of yellow, magenta, cyan and black based on the colors that are designated by those data. The printing section 14 develops the monochrome images of the individual colors in associated image memories in the image memory 15. When receiving the form feed code, the printing section 14 sends a command indicating the initiation of printing to the printer engine 16.

The image memory 15 consists of four image memories associated with the four colors of yellow, magenta, cyan and black, in each of which dot pattern of a respective monochrome image to be printed is developed. Areas where a plurality of pages are developed are secured in each of the image memories for yellow, magenta, cyan and black in accordance with the size of the image to be printed.

The printer engine 16 reads image data developed in the image memory 15 in response to the command issued from the printing section 14. The printer engine 16 prints images of colors corresponding to the monochrome images of yellow, magenta, cyan and black read from the image memory 15 on recording paper one on another by an electrophotographic technique.

The structure of the printer engine 16 will now be described with reference to the cross-sectional view of FIG. 3. As illustrated, the printer engine 16 comprises an interface section 160, a controller 161, RAMs 162K, 162Y, 162M and 162C, video interfaces 163K, 163Y, 163M and 163C, LED heads 164K, 164Y, 164M and 164C, photosensitive drums 165K, 165Y, 165M and 165C, developing units 166K, 166Y, 166M and 166C, developing rollers 167K, 167Y, 167M and 167C, charge brushes 168K, 168Y, 168M and 168C, transfer units 169K, 169Y, 169M and 169C, a paper feed belt 170 and a fixing unit 171.

The interface section 160 receives image data developed in the image memory 15. The image data received by this interface section 160 is supplied to the controller 161. The controller 161 discriminates image data of monochrome images of yellow (Y), magenta (M), cyan (C) and black (K) supplied from the interface section 160, and sends the image data of the individual monochrome images to the respective RAMs 162K, 162Y, 162M and 162C. The RAMs 162K, 162Y, 162M and 162C temporarily store the image data sent from the image memory 15 in order to output the image data with a delay of apredetermined timing. The controller 161 supplies a predetermined control code to the video interfaces 163K, 163Y, 163M and 163C at a predetermined timing in accordance with the form feed code supplied from the printing section 14. The video interfaces 163K, 163Y, 163M and 163C sends out the image data of the individual monochrome images, developed in the respective RAMs 162K, 162Y, 162M and 162C, to the LED heads 164K, 164Y, 164M and 164C in accordance with the control code from the controller 161.

The LED heads 164K, 164Y, 164M and 164C output lights corresponding to the image data output from the video interfaces 163K, 163Y, 163M and 163C. The lights emitted from the LED heads 164K, 164Y, 164M and 164C are irradiated on the respective photosensitive drums 165K, 165Y, 165M and 165C, which are charged with the respective charge brushes 168K, 168Y, 168M and 168C.

The developing units 166K, 166Y, 166M and 166C have toners of the respective colors. Each of the developing rollers 167K, 167Y, 167M and 167C holds a predetermined amount of toners of the associated color, which are retained in the associated one of the developing units 166K, 166Y, 166M and 166C. The toners carried by the developing rollers 167K, 167Y, 167M and 167C are transferred on the areas on the photosensitive drums 165K, 165Y, 165M and 165C where the lights are irradiated.

The transfer units 169K, 169Y, 169M and 169C transfer the toners, transferred on the photosensitive drums 165K, 165Y, 165M and 165C from the developing rollers 167K, 167Y, 167M and 167C, onto recording paper P. Cleaners (not shown) cleans the toners untransferred on the recording paper P and remaining on the photosensitive drums 165K, 165Y, 165M and 165C as well as charge the photosensitive drums 165K, 165Y, 165M and 165C.

The paper feed belt 170 feeds the recording paper P under the control of the controller 161. The fixing unit 171 applies heat to the recording paper P to fix the toners which have been transferred on the recording paper P by the transfer units 169K, 169Y, 169M and 169C.

The printing process of the color printer 1 according to this embodiment will be discussed below.

Figure 4:
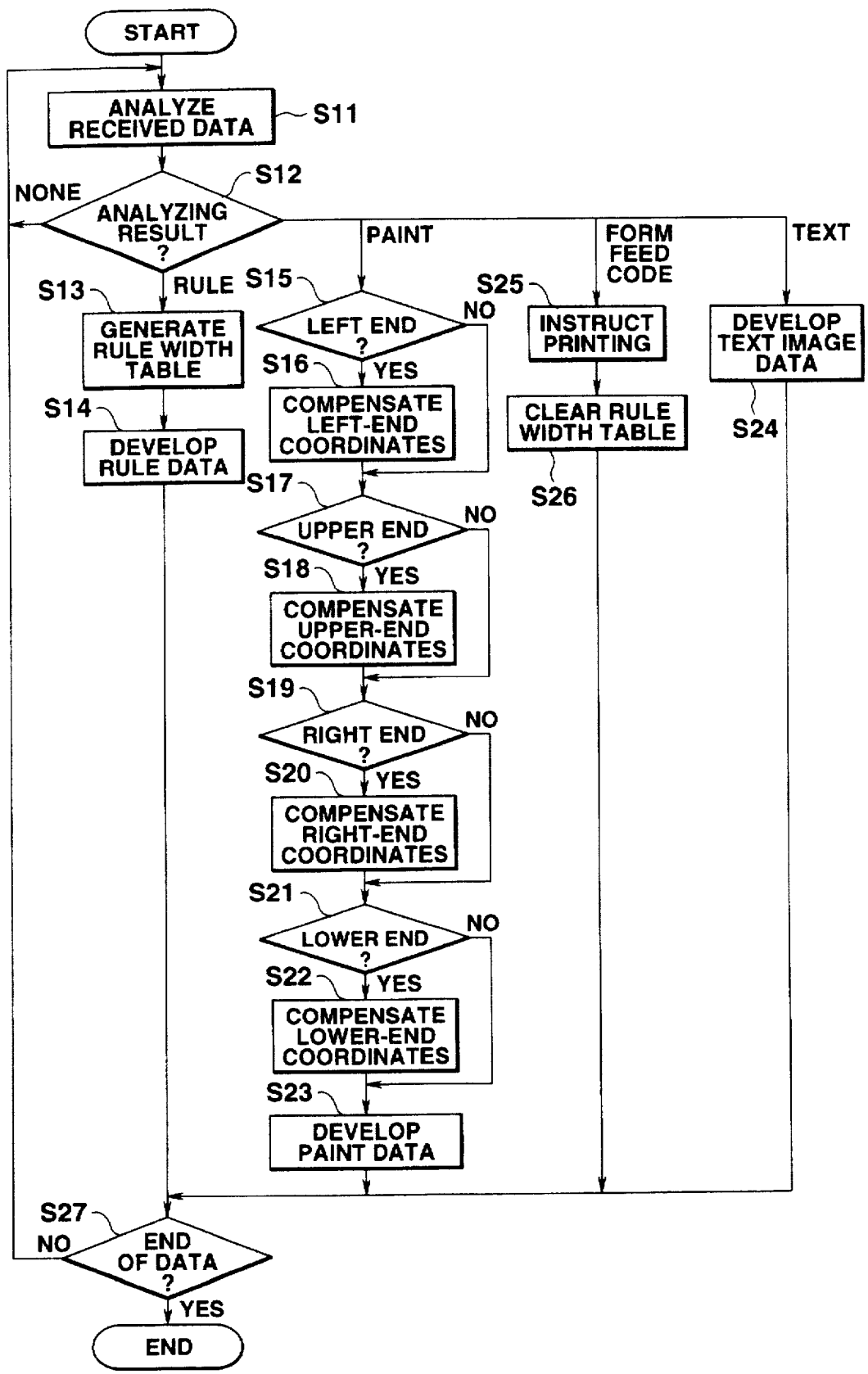
FIG. 4 is a flowchart illustrating the printing process of the color printer according to the first embodiment.

FIG. 4 is a flowchart illustrating the printing process of the color printer 1.

The process of this flowchart starts when the received data analyzer 11 receives print data output from the personal computer 2.

When the process starts, the received data analyzer 11 analyzes the print data supplied from the personal computer 2 (step S11). Next, the received data analyzer 11 determines whether or not the result of analysis on the print data has been obtained and which of rule data, paint data, text data and the form feed code the analysis result is (step S12). While it is determined in step S12 that no analysis result is obtained, the flow returns to step S11 to continue the analysis of the received data.

When the analysis result is acquired and is determined as rule data in step S12, the received data analyzer 11 supplies this rule data to the rule width table generator 12. The rule width table generator 12 generates a rule width table based on the supplied rule data (step S13). The rule width table generator 12 sends the generated rule width table to the compensation determining section 13. The compensation determining section 13 sends the rule data, supplied in the form of a rule width table, to the printing section 14. The printing section 14 develops the supplied rule data into the image memory 15 (step S14). The flow then proceeds to step S27.

When the analysis result is acquired and is determined as paint data in step S12, the received data analyzer 11 supplies the analysis result to the compensation determining section 13. The compensation determining section 13 detects the coordinate (x coordinate) of the left end of the paint data first (step S15). When the coordinate of the left end of the paint data is detected in step S15, the compensation determining section 13 compensates the coordinate of the left end of the paint data based on the rule width table supplied from the rule width table generator 12. This compensation is executed by shifting the coordinate of the left end of the paint data to a position where the left end of the paint area does not lie in the width of the rule (step S16). When the coordinate of the left end of the paint data is not detected in step S15, the process proceeds directly to step S17.

In step S17, the compensation determining section 13 detects the coordinate (y coordinate) of the upper end of the paint data. When the coordinate of the upper end of the paint data is detected in step S17, the compensation determining section 13 compensates the coordinate of the upper end of the paint data based on the rule width table supplied from the rule width table generator 12. This compensation is executed by shifting the coordinate of the upper end of the paint data to a position where the upper end of the paint area does not lie in the width of the rule (step S18). When the coordinate of the upper end of the paint data is not detected in step S17, the process proceeds directly to step S19.

In step S19, the compensation determining section 13 detects the coordinate (x coordinate) of the right end of the paint data. When the coordinate of the right end of the paint data is detected in step S19, the compensation determining section 13 compensates the coordinate of the right end of the paint data based on the rule width table supplied from the rule width table generator 12. This compensation is executed by shifting the coordinate of the right end of the paint data to a position where the right end of the paint area does not lie in the width of the rule (step S20). When the coordinate of the right end of the paint data is not detected in step S19, the process proceeds directly to step S21.

In step S21, the compensation determining section 13 detects the coordinate (y coordinate) of the lower end of the paint data. When the coordinate of the lower end of the paint data is detected in step S21, the compensation determining section 13 compensates the coordinate of the lower end of the paint data based on the rule width table supplied from the rule width table generator 12. This compensation is executed by shifting the coordinate of the lower end of the paint data to a position where the lower end of the paint area does not lie in the width of the rule (step S22). When the coordinate of the lower end of the paint data is not detected in step S21, the process proceeds directly to step S23.

The paint data the coordinates of whose left end, upper end, right end and/or lower end have been compensated in the processing from step S15 to step S23 is sent to the printing section 14 from the compensation determining section 13. The printing section 14 develops the paint data into the image memory 15 (step S23). The process then goes to step S27.

When the analysis result is acquired and is determined as text data in step S12, this text data is supplied to the printing section 14 from the received data analyzer 11 via the compensation determining section 13. The printing section 14 develops the image data of characters or symbols corresponding to the supplied text data in the image memory 15 (step S24). The process then proceeds to step S27.

When the analysis result is acquired and is determined as the form feed code in step S12, this form feed code is supplied via the compensation determining section 13 to the printing section 14 from the received data analyzer 11. When receiving the form feed code, the printing section 14 instructs the printer engine 16 to print the image developed in the image memory 15 (step S25). As a result, the printer engine 16 reads the image data of four colors of yellow, magenta, cyan and black developed in the image memory 15 and prints the individual monochrome images on recording paper one on another by the electronic photographic technique. Then, the rule width table generated by the rule width table generator 12 is cleared (step S26) after which the process goes to step S27.

In step S27, the received data analyzer 11 determines if analysis of all the received data has been completed. When it is determined in step S27 that analysis of all the received data has not been completed yet, the process returns to step S11 where the received data analyzer 11 analyzes the next data. When it is determined in step S27 that analysis of all the received data has been completed, the processing in this flowchart is terminated.

According to this embodiment, print data is supplied to the color printer 1 from the personal computer 2 in the order of rule data, paint data, text data and the form feed code. When print data consists of data for printing one page of image, for example, a rule width table including all the rule data is generated from the first rule data supplied, and the image data of rules is developed in the image memory 15. The paint data supplied next is compensated in accordance with rule width table and the image data of the paint data is developed in the image memory 15. After the image data of characters according to the text data is developed in the image memory 15, the printing section 14 prints the image on recording paper upon reception of the form feed code.

The printing process of the color printer 1 according to this embodiment will now be described more specifically with reference to a specific example. Although the following description will be given of the case where there are rules at the left end and the upper end of a paint area, paint data can also be compensated by the same processing in the case where rules are located at the right end and the lower end.

Figure 5A:
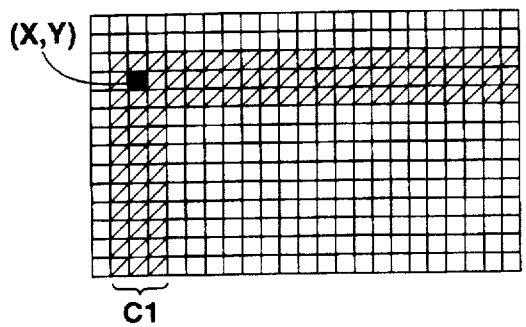
FIGS. 5A through 5C are exemplary diagrams illustrating the printing process of the color printer according to the first embodiment.
Figure 5B:
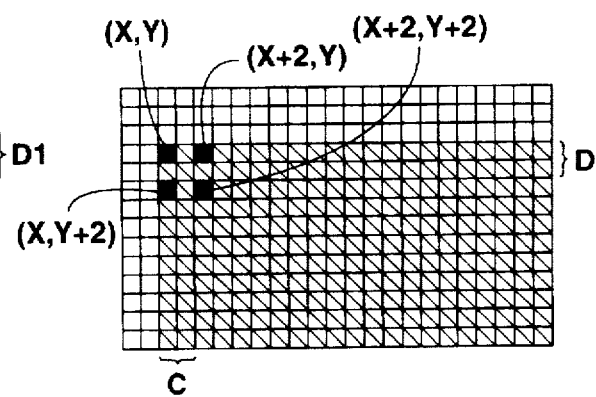
Figure 5C:
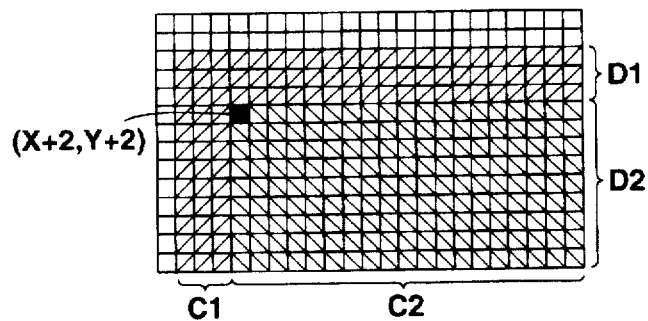

In this example, as shown in FIG. 5A, rule data indicates two rules, namely a rule C1 having a width of three dots parallel to the Y axis which has a point at the coordinates (X, Y), and a rule D1 having a width of three dots parallel to the X axis which has a point at the coordinates (X, Y). The colors of the rules C1 and D1 are magenta. A rule width table including the rule data of those rules is generated in step S13, and the rule data is developed in the image memory 15 as illustrated in step S14. At this time, X is the coordinate (x coordinate) of the left end of paint data and Y is the coordinate (y coordinate) of the upper end as shown in FIG. 5B. The color of the paint area is yellow. That is, the areas in the paint area indicated by C and D in FIG. 5B overlap the rules. When the coordinate of the left end of the paint data is detected in step S15, the coordinate (x coordinate) of the left end of the paint data is compensated to X+2 in step S16 so that the portion C in the paint area does not overlap the rules. When the coordinate of the upper end of the paint data is detected in step S17, the coordinate (y coordinate) of the upper end of the paint data is compensated to Y+2 in step S18 so that the portion D in the paint area does not overlap the rules. Accordingly, the rules to be printed do not overlap the paint area as shown in FIG. 5C. The color of the rules C1 and D1 can be printed in the designated color of magenta.

Since the color printer 1 of this embodiment compensates paint data based on a rule width table, as described above, the images of rules do not overlap an image to be painted. The printer can therefore reliably print rules in designated colors, thus improving the quality of the obtained color image.

Second Embodiment

FIG. 6 presents a block diagram showing the functions of a color printer 3 according to the second embodiment of this invention. As illustrated, this color printer 3 comprises a received data analyzer 31, a whole-rules-in-one-color table generator 32, a rule width table generator 33, a compensation determining section 34, a printing section 35, an image memory 36 and a printer engine 37. Like the color printer 1 of the first embodiment, the color printer 3 has a CPU and RAM and accomplishes the functions of the other sections 31 to 36 other than the printer engine 37 by a predetermined printer program.

The color printer 3 is connected to a personal computer 2 whose structure and operation are the same as those of the personal computer 2 of the first embodiment.

The received data analyzer 31 receives the print data from the personal computer 2. The received data analyzer 31 extracts rule data from the received print data and sends it to the whole-rules-in-one-color table generator 32 and the rule width table generator 33. The received data analyzer 31 sends the other data than the rule data to the compensation determining section 34.

Figure 7:
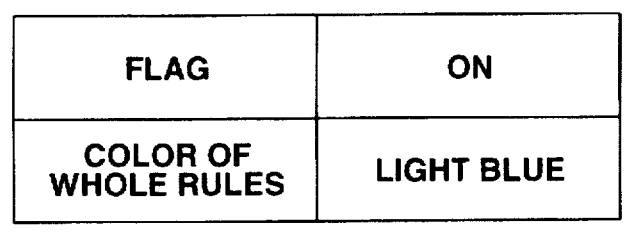

The whole-rules-in-one-color table generator 32 generates a whole-rules-in-one-color table based on the rule data supplied from the received data analyzer 31. As shown in FIG. 7, the whole-rules-in-one-color table stores a flag indicating if all the colors of rules included in one page are the same, and data on the color of the rules in that case. The whole-rules-in-one-color table generator 32 supplies the generated whole-rules-in-one-color table to the compensation determining section 34.

The rule width table generator 33 generates a rule width table based on the rule data supplied from the received data analyzer 31. The rule width table generated by the rule width table generator 33 includes data indicative of the colors of rules as shown in FIG. 8 in addition to data contained in the rule width table of the first embodiment. The rule width table generator 33 supplies the generated rule width table to the compensation determining section 34.

The compensation determining section 34 extracts rule data from the rule width table supplied from the rule width table generator 33 and supplies it to the printing section 35. Referring to the whole-rules-in-one-color table, the compensation determining section 34 determines whether or not paint data should be compensated. When determining based on the whole-rules-in-one-color table that paint data should be compensated, the compensation determining section 34 determines if the paint data needs further compensation by referring to the rule width table. When determining based also on the rule width table that paint data should be compensated, the compensation determining section 34 compensates the paint data supplied from the received data analyzer 31. Specifically, when the color of the rules differs from black or the color of the paint area, the compensation determining section 34 compensates the coordinates of the paint data in such a way that the paint area does not overlap the rules. The compensation determining section 34 supplies the compensated paint data to the printing section 35. The compensation determining section 34 also supplies the text data and form feed code, supplied from the received data analyzer 31, to the printing section 35.

The printing section 35, the image memory 36 and the printer engine 37 are the same as those of the color printer 1 of the first embodiment.

The printing process of the color printer 3 according to this embodiment will now be discussed.

Figure 9:
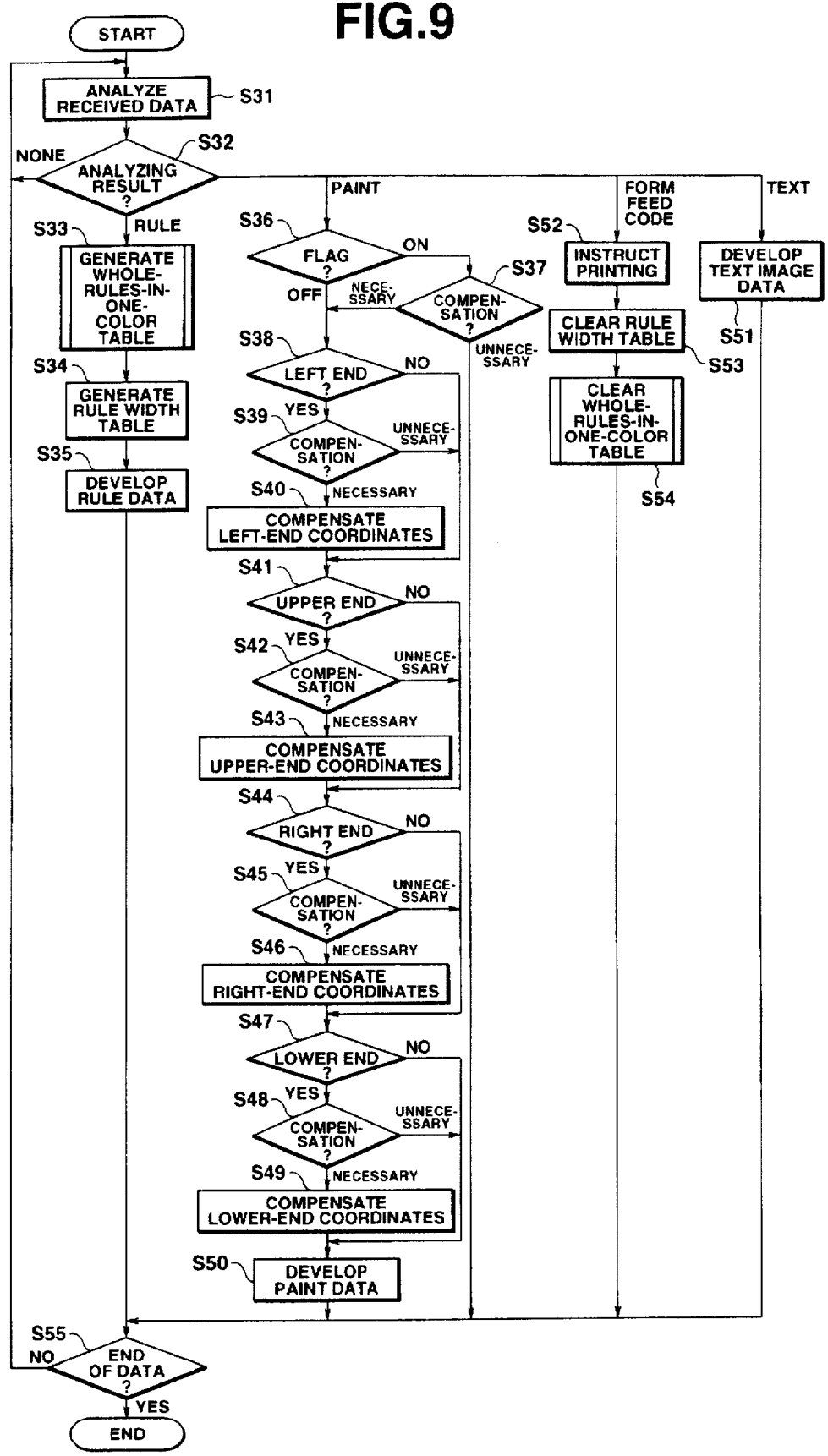
FIG. 9 is a flowchart illustrating the printing process of the color printer according to the second embodiment.

FIG. 9 is a flowchart illustrating the printing process of the color printer 3.

The process of this flowchart starts when the received data analyzer 31 receives print data output from the personal computer 2.

When the process starts, the received data analyzer analyzes the print data supplied from the personal computer 2 (step S31). Next, the received data analyzer 31 determines whether or not the result of analysis on the print data has been obtained and which of rule data, paint data, text data and the form feed code the analysis result is (step S32). While it is determined in step S32 that no analysis result is obtained, the flow returns to step S31 to continue the analysis of the received data.

When the analysis result is acquired and is determined as rule data in step S32, the received data analyzer 31 supplies this rule data to the whole-rules-in-one-color table generator 32 and the rule width table generator 33. The whole-rules-in-one-color table generator 32 generates a whole-rules-in-one-color table based on the supplied rule data (step S33). The whole-rules-in-one-color table generator 32 supplies the generated whole-rules-in-one-color table to the compensation determining section 34. Specifically, the whole-rules-in-one-color table generator 32 generates the whole-rules-in-one-color table in accordance with the subroutine described in the flowchart in FIG. 10.

Figure 10:
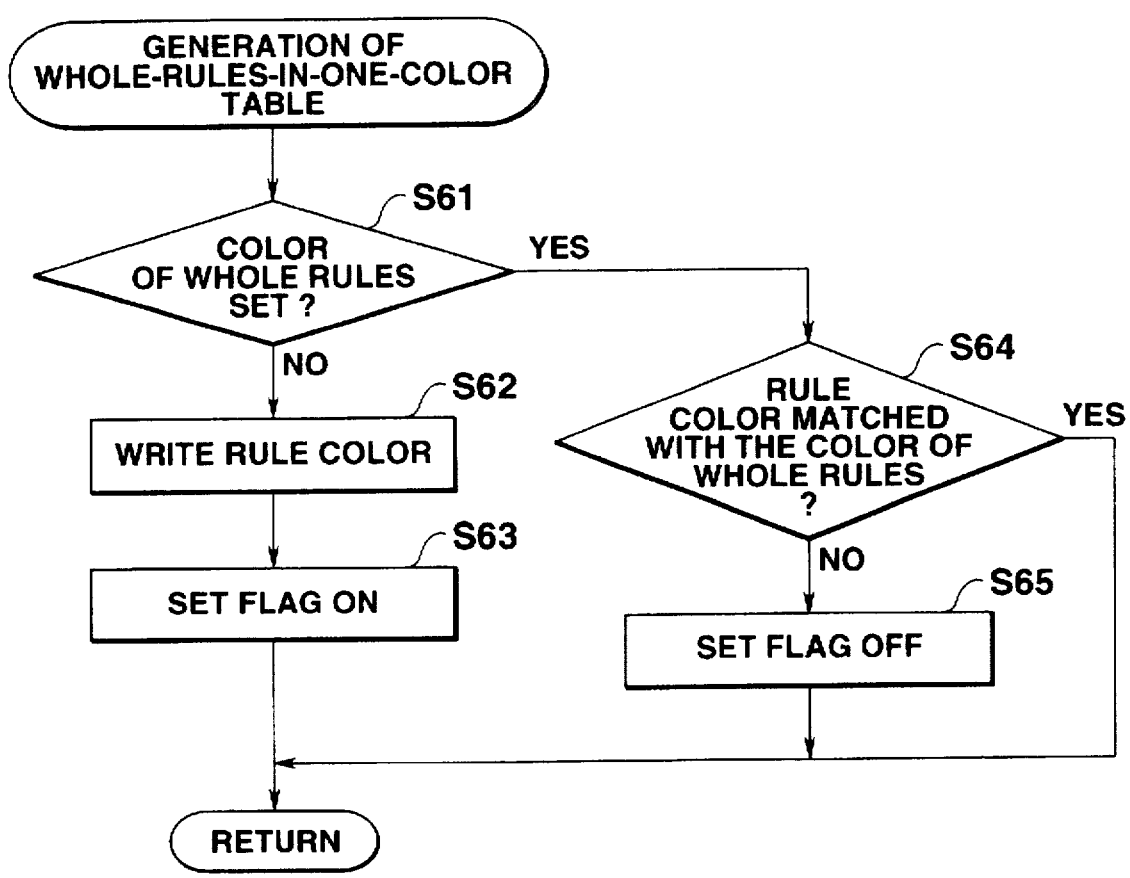
FIG. 10 is a flowchart illustrating a process of generating a whole-rules-in-one-color table in the flowchart in FIG. 9.

When the subroutine in the flowchart shown in FIG. 10 starts, it is determined if some kind of a rule color is set in the field of the color of whole rules in the whole-rules-in-one-color table (step S61). When it is determined in step S61 if no rule color is set in the field of the color of whole rules, the color which is indicated by the rule data is written in the field of the color of whole rules (step S62) and a whole-rules-in-one-color flag is set on (step S63). Then, this subroutine is terminated. When it is determined in step S61 if some rule color is set in the field of the color of whole rules, on the other hand, it is determined if the rule color indicated by the rule data supplied from the received data analyzer 31 matches with the color of whole rules in the whole-rules-in-one-color table (step S64). When it is determined in step S64 that the rule color indicated by the rule data matches with the color of whole rules, this subroutine is terminated. When it is determined in step S64 that the rule color indicated by the rule data is inconsistent with the color of whole rules, the whole-rules-in-one-color flag is set off (step S65) after which this subroutine will be terminated. As this subroutine is terminated, the flow returns to the main routine of the flowchart illustrated in FIG. 9.

The rule width table generator 33 generates a rule width table based on the supplied rule data (step S34). The rule width table generator 33 sends the generated rule width table to the compensation determining section 34. The compensation determining section 34 sends the rule data, supplied in the form of a rule width table, to the printing section 35. The printing section 35 develops the supplied rule data into the image memory 36 (step S35). The flow then proceeds to step S55.

When the analysis result is acquired and is determined as paint data in step S32, the received data analyzer 31 supplies the analysis result to the compensation determining section 34. The compensation determining section 34 determines if the whole-rules-in-one-color flag in the whole-rules-in-one-color table is on or off (step S36). When it is determined in step S36 that the whole-rules-in-one-color flag is set on, the compensation determining section 34 discriminates whether or not the color of the paint data coincides with the color of whole rules in the whole-rules-in-one-color table to thereby determine if the paint data should be compensated (step S37). When it is determined in step S37 that the paint data need not be compensated, the flow proceeds to step S55.

When it is determined in step S37 that the paint data should be compensated, the compensation determining section 34 detects the coordinate (x coordinate) of the left end of the paint data first (step S38). When the coordinate of the left end of the paint data is detected in step S38, the compensation determining section 34 determines if the paint data should be compensated by referring to the rule color in the rule width table supplied from the rule width table generator 33 (step S39). When it is determined in step S39 that the paint data needs to be compensated, the compensation determining section 34 compensates the coordinate of the left end of the paint data based on the rule width table. This compensation is executed by shifting the coordinate of the left end of the paint data to a position where the left end of the paint area does not lie in the width of the rule (step S40). When the coordinate of the left end of the paint data is detected in step S38 and when it is determined in step S39 that the paint data need not be compensated, the process proceeds to step S41.

In step S41, the compensation determining section 34 detects the coordinate (y coordinate) of the upper end of the paint data. When the coordinate of the upper end of the paint data is detected in step S41, the compensation determining section 34 determines if the paint data should be compensated by referring to the rule color in the rule width table supplied from the rule width table generator 33 (step S42). When it is determined in step S42 that the paint data needs to be compensated, the compensation determining section 34 compensates the coordinate of the upper end of the paint data based on the rule width table. This compensation is executed by shifting the coordinate of the upper end of the paint data to a position where the upper end of the paint area does not lie in the width of the rule (step S43). When the coordinate of the upper end of the paint data is detected in step S41 and when it is determined in step S42 that the paint data need not be compensated, the process proceeds to step S44.

In step S44, the compensation determining section 34 detects the coordinate (x coordinate) of the right end of the paint data. When the coordinate of the right end of the paint data is detected in step S44, the compensation determining section 34 determines if the paint data should be compensated by referring to the rule color in the rule width table supplied from the rule width table generator 33 (step S45). When it is determined in step S45 that the paint data needs to be compensated, the compensation determining section 34 compensates the coordinate of the right end of the paint data based on the rule width table. This compensation is executed by shifting the coordinate of the right end of the paint data to a position where the right end of the paint area does not lie in the width of the rule (step S46). When the coordinate of the right end of the paint data is detected in step S44 and when it is determined in step S45 that the paint data need not be compensated, the process proceeds to step S47.

In step S47, the compensation determining section 34 detects the coordinate (y coordinate) of the lower end of the paint data. When the coordinate of the lower end of the paint data is detected in step S47, the compensation determining section 34 determines if the paint data should be compensated by referring to the rule color in the rule width table supplied from the rule width table generator 33 (step S48). When it is determined in step S48 that the paint data needs to be compensated, the compensation determining section 34 compensates the coordinate of the lower end of the paint data based on the rule width table. This compensation is executed by shifting the coordinate of the lower end of the paint data to a position where the lower end of the paint area does not lie in the width of the rule (step S49). When the coordinate of the lower end of the paint data is detected in step S47 and when it is determined in step S48 that the paint data need not be compensated, the process proceeds to step S50.

The paint data the coordinates of whose left end, upper end, right end and/or lower end have been compensated in the processing from step S36 to step S49 is sent to the printing section 35 from the compensation determining section 34. The printing section 35 develops the paint data into the image memory 36 (step S50). The process then goes to step S55.

When the analysis result is acquired and is determined as text data in step S32, this text data is supplied to the printing section 35 from the received data analyzer 31 via the compensation determining section 34. The printing section 35 develops the image data of characters or symbols corresponding to the supplied text data in the image memory 36 (step S51). The process then proceeds to step S55.

When the analysis result is acquired and is determined as the form feed code in step S32, this form feed code is supplied via the compensation determining section 34 to the printing section 35 from the received data analyzer 31. When receiving the form feed code, the printing section 35 instructs the printer engine 37 to print the image developed in the image memory 36 (step S52). As a result, the printer engine 37 reads the image data of four colors of yellow, magenta, cyan and black developed in the image memory 36 and prints the individual monochrome images on recording paper one on another by the electronic photographic technique. Then, the rule width table generated by the rule width table generator 33 is cleared (step S54) and the whole-rules-in-one-color table generated by the whole-rules-in-one-color table generator 32 is cleared (step S54) after which the process proceeds to step S55.

In step S55, the received data analyzer 31 determines if analysis of all the received data has been completed. When it is determined in step S55 that analysis of all the received data has not been completed yet, the process returns to step S31 where the received data analyzer 31 analyzes the next data. When it is determined in step S55 that analysis of all the received data has been completed, the processing in this flowchart is terminated.

The printing process of the color printer 3 according to this embodiment will now be described more specifically with reference to a specific example. Although the following description will be given of the case where there are rules at the left end and the upper end of a paint area, paint data can also be compensated by the same processing in the case where rules are located at the right end and the lower end.

Figure 11A:
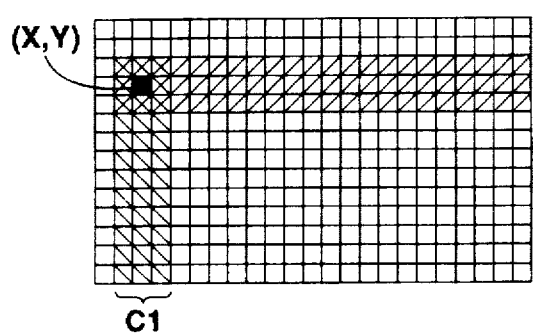
FIGS. 11A through 11C are exemplary diagrams illustrating the printing process of the color printer according to the second embodiment.
Figure 11B:
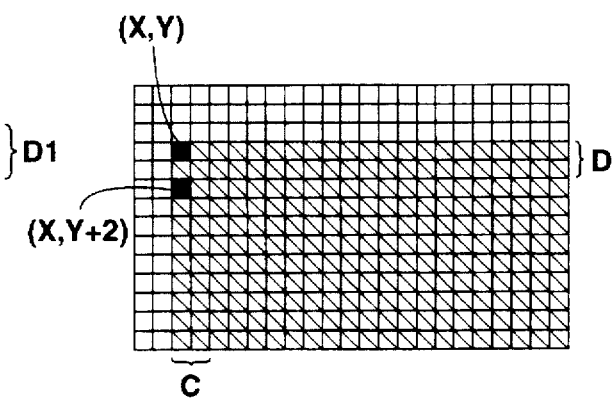
Figure 11C:
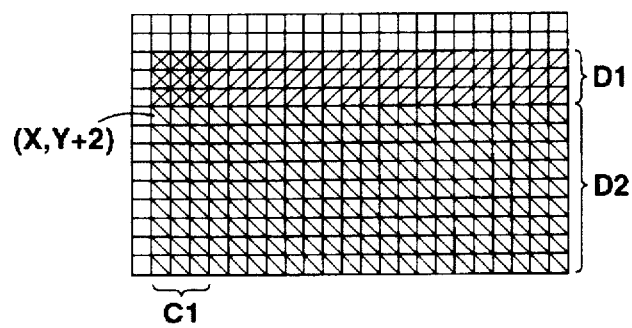
Figure 12A:
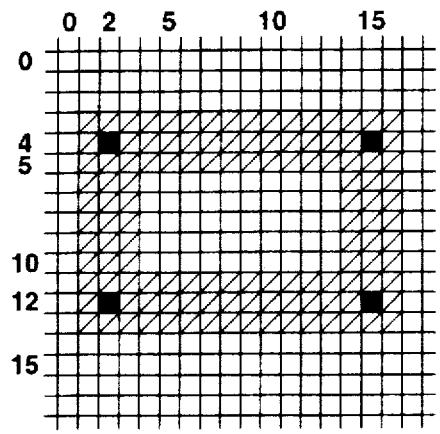
FIGS. 12A through 12C are exemplary diagrams showing the printing process of a conventional color printer.
Figure 12B:
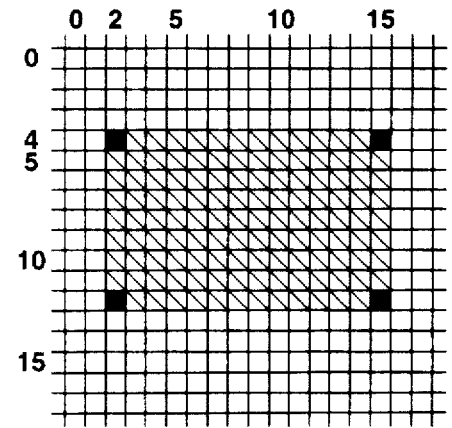
Figure 12C:
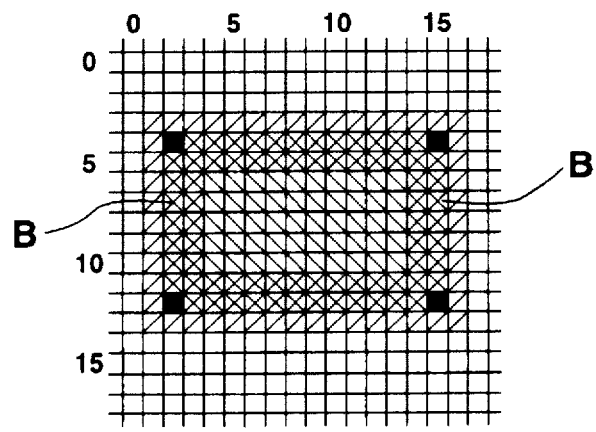

In this example, as shown in FIG. 11A, rule data indicates two rules, namely a rule C1 parallel to the Y axis which has a point at the coordinates (X, Y) and having a width of three dots and a color of yellow, and a rule D1 parallel to the X axis which has a point at the coordinates (X, Y) having a width of three dots and a color of magenta. In this case, the whole-rules-in-one-color flag in the whole-rules-in-one-color table is set off in step S33. X is the coordinate (x coordinate) of the left end of paint data and Y is the coordinate (y coordinate) of the upper end as shown in FIG. 11B. The areas indicated by "C" and "D" in FIG. 11B overlap the rules and, particularly, the color of the area D differs from the color of the rule D1. When it is determined in step S36 that the flag is off and the coordinate of the left end of the paint data is detected in step S38, the compensation determining section 34 reads from the rule width table the color of the rule C1 which overlap the left end of the paint area at the portion C. In this case, since the rule color matches with the color of the paint data, it is determined in step S39 that the coordinate of the left end of the paint data should not be compensated. Then, the process goes to step S41 with the coordinate (x coordinate) of the left end of the paint data remaining as X. When the coordinate of the upper end of the paint data is detected in step S41, the compensation determining section 34 reads from the rule width table the color of the rule D1 which overlap the upper end of the paint area at the portion D. In this case, since the rule color differs from the color of the paint data, it is determined in step S42 that the coordinate of the upper end of the paint data should be compensated. The compensation determining section 34 compensates the coordinate (y coordinate) of the upper end of the paint data to Y+2 in step S43 so that the portion D in the paint area does not overlap the rule. Accordingly, that of the rules to be printed whose color differs from the color of the paint area does not overlap the paint area as shown in FIG. 11C. The rules C1 and D1 can be printed in the respective designated colors.

Since the color printer 3 of this embodiment need not compensate the coordinates of paint data when the color of the rules matches with the color of the paint area, its printing process is faster than that of the color printer 1 of the first embodiment.

Modifications Of Embodiments

Although the coordinates of paint data are not compensated when the color of the rules matches with the color of the paint area in the second embodiment, the coordinates of paint data need not be compensated too when the color of the rules is black. This is because the printer engine 37 transfers the black toners on recording paper P last, rules even if overlapping toners of other colors can be printed in black.

According to the first and second embodiments, an image which is drawn in a paint area is a solid image which fills the entire paint area in a certain color. But, an image to be drawn in a paint area may be a hatched image or a tint print image.

According to the first and second embodiments, print data is output from the personal computer 2 in the order of rule data, paint data, text data and the form feed code. However, rule data, paint data, text data and the form feed code may be sent out from the personal computer 2 in any order. In this case, the color printer 1 or 3 should store those data in the memory in the color printer 1 or 3, and should generate a rule width table (and whole-rules-in-one-color table) from the rule data stored in the memory to compensate paint data.

According to the first and second embodiments, a paint area is a rectangle surrounded by rules. Even when a paint area takes another shape, however, this invention can be adapted as well. When a circular area is to be painted, for example, data indicating a circle consists of the coordinates of the center of the circle, the radius of the circle from the coordinates of the center and the line width. At this time, data of the paint area consists of the coordinates of the center of the circle and the radius of the circle from the coordinates of the center. In this case, data indicating a circle should be stored in the memory and the radius of data indicating a paint area should be compensated in such a way that the line drawing the circle does not overlap the paint area.

According to the first and second embodiments, the images of rules, a paint area and characters, which respectively correspond to rule data, paint data and text data input from the personal computer 2 are developed in the image memory 15 or 36. This invention may however be adapted to a color printer which develops the images of rules and the images of a paint area and characters in separate image memories and synthesizes the images developed in those image memories to print a color image. Because a color printer designed as such need not repeatedly develop the images of rules in the image memory, it is suitable to print the image of plural pieces of data which uses a spreadsheet of the same form.

According to the first and second embodiments, a rule width table or a rule width table and a whole-rules-in-one-color table are cleared when a print instruction is given to the printer engine 16 or 37 in step S25 or step S52. When the same rules are used successively, however, the rule width table (and the whole-rules-in-one-color table) need not be cleared. In this case, the personal computer 2 may supply a control code indicating the use of the same rule to the color printer 1 or 3 without supplying rule data to the color printer 1 or 3.

According to the first and second embodiments, the printer engine 16 or 37 in the color printer 1 or 3 synthesizes monochrome images of four colors (yellow, magenta, cyan and black) to print a color image. This invention can however be adapted to any color printer which prints a color image by synthesizing monochrome images of three or more colors which are not complementary to one another.

According to the first and second embodiments, the color printer 1 or 3 uses the printer engine 16 or 37 that employs an electrophotographic technique. This invention can however be adapted to color printers which use other type of printer engines such as a laser type, a thermal transfer type and an ink jet type.

According to the first and second embodiments, the compensation determining section 13 or 34 in the color printer 1 or 3 compensates a print area of a paint image based on a rule width table (and a whole-rules-in-one-color table). Alternatively, the personal computer 2 may compensate the print area of a paint image and supply the compensated data to the color printer. In this case, the personal computer 2 should have an application program which designate the print area of a paint image. This application program may be supplied in the form of a stored program in a storage medium, such as a CD-ROM or a floppy disk. The printer program which accomplishes the functions of the color printer 1 or 3 may also be supplied in the form of a stored program in a storage medium like a CD-ROM or a floppy disk.

What is claimed is:

1. A color printer comprising:

a received data analyzer for receiving first image data including externally supplied data indicative of a first area for printing a first image on a recording medium, and for receiving second image data including externally supplied data indicative of a second area for printing a second image on said recording medium;

a compensation determining section for discriminating an overlapping area where said first and second areas overlap, and for compensating said second area in accordance with a result of discrimination; and a printing section for printing said first image in said first area and for printing said second image in said second area compensated by said compensation determining section.

2. The color printer according to claim 1, wherein said compensation determining section performs compensation to reduce said second area by said discriminated overlapping area.

3. The color printer according to claim 1, wherein said first and second image data further include data indicating respective colors of said first and second images; and wherein said compensation determining section: (i) determines if said colors of said first and second images are identical; and (ii) does not compensate said second area when said colors of said first and second images are identical.

4. The color printer according to claim 1, wherein said first image data comprises plural pieces of image data;

wherein said first and second image data further include data indicating respective colors of said first and second images; and wherein said compensation determining section: (i) determines if colors of individual images indicated by said plural pieces of image data of said first image data are identical; (ii) determines if said colors of said individual images are identical to said color of said second image when said colors of said individual images are identical to one another; and (iii) does not compensate said second area when said colors of said individual images are identical to said color of said second image.

5. The color printer according to claim 4, wherein said compensation determining section: (i) determines if respective ones of said colors of said individual images are identical to said color of said second image when said colors of said individual images are not identical to one another; and (ii) compensates said second area only with respect to said first area for said individual images whose respective colors are not identical to said color of said second image.

6. The color printer according to claim 1, wherein said printing section includes:

a controller for separating each of said first and second images to monochrome images of yellow, magenta, cyan and black;

an image memory for storing said separated monochrome images separated by said controller; and transfer units for transferring said stored monochrome images onto a recording medium with color agents corresponding to colors of said monochrome images.

7. The color printer according to claim 1, wherein said first image data further includes data indicating a color of said first image; and wherein said compensation determining section: (i) determines if said color of said first image indicated by said first image data is black; and (ii) does not compensate said second area when said color of said first image is black.

8. The color printer according to claim 7, wherein said printing section includes:

a controller for separating each of said first and second images to monochrome images of yellow, magenta, cyan and black;

an image memory for storing said separated monochrome images separated by said controller; and transfer units for transferring said stored monochrome images onto a recording medium with respective color agents corresponding to said yellow, magenta, cyan and black colors of said monochrome images, said color agent for black being transferred onto said recording medium after said color agents for yellow, magenta and cyan.

9. A printing method comprising the steps of:

discriminating an overlapping area where a first area for printing a first image on a recording medium and a second area for printing a second image on said recording medium overlap each other; compensating said second area in accordance with a result of discrimination;

printing said first image in said first area; and printing said second image in said compensated second area.

10. The printing method according to claim 9, wherein said first image is a line image and said second image is a paint image; and wherein said step of compensating said second area comprises reducing said second area in such a manner that said paint image does not overlap said line image.

11. The printing method according to claim 9, wherein:

said first image comprises a plurality of rules;

said first area is designated by coordinates of both ends and a width of each of said plurality of rules;

said second image comprises a rectangular image surrounded by four of said plurality of rules;

said second area is designated by coordinates of a left end, right end, upper end and lower end of said rectangular image;

said step of discriminating said overlapping area where said first area and said second area overlap each other comprises discriminating that said coordinates of said left end, right end, upper end and lower end of said rectangular image lie within said widths of said plurality of rules; and said step of compensating said second area comprises compensating said coordinates of said left end, right end, upper end and lower end of said rectangular image.

12. The printing method according to claim 9, further comprising a step of determining if colors of said first and second images are identical; and wherein said step of compensating said second area comprises compensating said second area only when said colors of said first and second images are not identical.

13. The printing method according to claim 9, further comprising a step of determining if a color of said first image is black; and wherein said step of compensating said second area comprises compensating said second area only when said color of said first image is not black.

14. A program storage medium for storing a program for enabling a computer to realize the functions of:

discriminating an overlapping area where a first area for printing a first image on a recording medium and a second area for printing a second image on said recording medium overlap each other;

compensating said second area in accordance with a result of discrimination;

instructing printing of said first image in said first area; and instructing printing of said second image in said compensated second area.

15. The program storage medium according to claim 14, wherein said program further enables said computer to realize the functions of:

determining if colors of said first and second images are identical; and inhibiting compensation of said second area when said colors of said first and second images are identical to each other.

16. The program storage medium according to claim 14, wherein said program further enables said computer to realize the functions of:

determining if a color of said first image is black; and inhibiting compensation of said second area when said color of said first image is black.

* * * * *